Z. H. HANEY.
GEAR ATTACHMENT FOR PULLEYS.
APPLICATION FILED JULY 16, 1915.
1,202,185.
Patented Oct. 24, 1916.
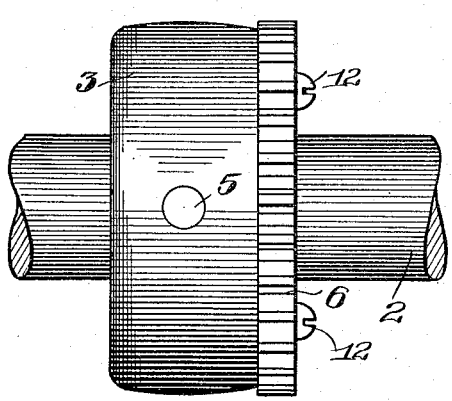
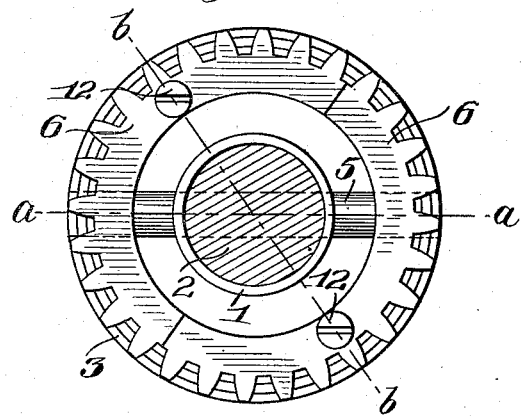
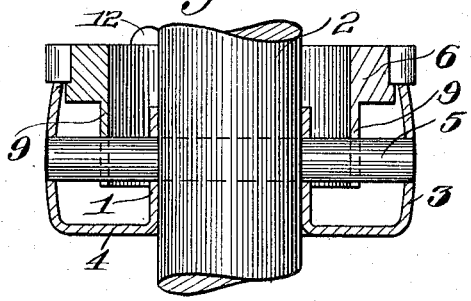
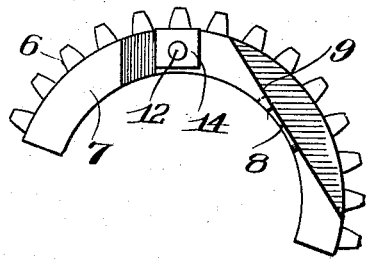
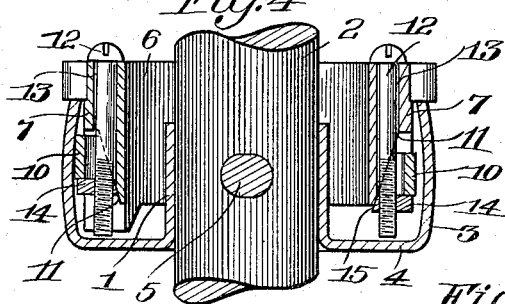
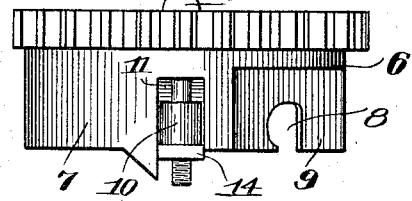
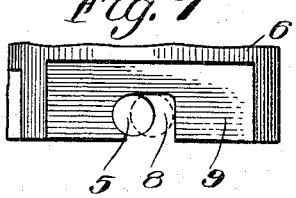
INVENTOR
Zelotes H. Haney
BY
H. H. Simms
his ATTORNEY

UNITED STATES PATENT OFFICE.

ZELOTES H. HANEY, OF CLIFTON SPRINGS, NEW YORK.

GEAR ATTACHMENT FOR PULLEYS.

1,202,185.  Specification of Letters Patent.  Patented Oct. 24, 1916.

Application filed July 16, 1915. Serial No. 40,253.

*To all whom it may concern:*

Be it known that I, ZELOTES H. HANEY, of Clifton Springs, in the county of Ontario and State of New York, have invented a new and useful Gear Attachment for Pulleys, fully set forth in the following specification and shown in the accompanying drawings.

The present invention relates to gear attachments for pulleys and an object of the same is to provide a construction which may be readily attached to or disconnected from a pulley without the necessity of providing holes or other special means on such pulley but, instead, utilizing parts of the pulley for effecting such attachment.

To this and other ends, the invention consists in certain parts and combinations of parts all of which will be hereinafter described, the novel features being pointed out in the appended claims.

In the drawings: Figure 1 is a view of a pulley with the gear attachment secured thereto; Fig. 2 is a side view of the pulley and the attachment; Fig. 3 is a section on the line *a—a*, Fig. 2; Fig. 4 is a section on the line *b—b*, Fig. 2; Figs. 5 and 6 are two detail views of one of the gear sections; and Fig. 7 is a detailed view showing the manner of interlocking one of the sections to the pin which secures the pulley to its shaft.

The pulley herein illustrated is like that now used on the drive shaft of the motor employed in the "Ford" automobile, the gear attachment being applied to such pulley for the purpose of obtaining power for an air pump or other suitable device. However, it will be understood that the attachment is not limited to this use.

The pulley above mentioned is stamped from sheet metal to provide an inner sleeve 1 fitting the shaft 2, an outer flange 3 connected to the sleeve 1 by a web 4 and providing the rim or periphery of the pulley, this rim being convexed in order that the belt which travels thereon will not slip off. A pin 5 extends through the rim 3, the sleeve 1, and the shaft 2 to hold the pulley to the shaft.

The attachment preferably embodies a plurality of gear segments 6, two in this instance, which, when combined, produce a continuous gear, the purpose of making the gear in sections being to permit it to be passed about a shaft. The circle formed by the apexes to the teeth of this gear portion of the attachment is preferably substantially equal to the diameter of the pulley, and, from the plane of the teeth, of each gear portion a curved laterally-extending portion 7 projects for fitting within the rim of the pulley, this laterally-extending portion being smaller in diameter than the gear portion so that the teeth of the gear portion may abut the side of the pulley. Each section is preferably provided with a bayonet slot 8 in its laterally-extending flange, said slot being adapted to receive the pin 5 and, upon a slight turning of the pulley section, causing the section to interlock with said pin. The flange may also be flattened at 9 in proximity to the bayonet slot 8. Each gear section also carries movable means for entering into binding engagement with the inner periphery of the rim. In this instance, this means embodies a wedge member 10 which operates upon an inclined surface 11 formed on the projecting portion 7 of the gear section. For moving this wedge member, a screw 12 is provided which extends through a bore 13 that intersects the inclined surface 11. On this screw, a nut 14 operates, said nut bearing against one end of the wedge member 10 and having a beveled face 15 which engages the inclined surface 11, the wedge member 10 straddling the bolt 12. It is apparent that, when the screw 12 is rotated in one direction, the movable wedge member 10 will move downwardly on the inclined surface 11 as shown at the right hand side of Fig. 4 so that the section of the gear may be withdrawn while, if the screw 12 is rotated in the other direction, the nut 14 will move the wedge member 10 upwardly on the inclined surface 11 and cause it to bind against the inner periphery of the rim 3 as shown in the left hand side of Fig. 4, thereby holding the section to the rim and at the same time forcing the abutting ends of the gear sections into firm engagement.

In using the device, the gear sections are fitted together in abutting relation with their wedge members in innermost positions as shown at the right hand side of Fig. 4, after which the sections are introduced through the open side of the pulley so that the pin 5 is received within the bayonet slots 8. Upon the turning of the sections a slight distance, such sections interlock with the pin 5. A screw driver is now employed to turn the screws in the direction to move the wedge members 10 upwardly on the inclined surface 11, causing said wedge members to bind against the inner periphery of the rim in the manner shown at the left hand side of Fig. 4, thus firmly securing the gear sections to the pulley.

A gear attachment constructed in accordance with this invention is inexpensive to manufacture and may be sold as a separate article for attachment to the pulley without requiring any work on the pulley to effect such attachment. Each section interlocks with a portion of the pulley as, for instance, the pulley securing pin, by a simple turning movement, and, in addition, each section carries a movable means which enters into binding engagement with the inner periphery of the pulley to still further hold the sections against movement.

What I claim as my invention and desire to secure by Letters Patent, is:

1. A gear attachment for pulleys comprising a plurality of abutting sections, each of which is provided with a curved portion extending to one side of the effective gear portion of the section for fitting within the rim of the pulley, and means carried by said curved portion of each section and movable outwardly thereon into binding engagement with the inner periphery of the pulley.

2. A gear attachment for pulleys comprising a plurality of abutting sections each of which is provided with a curved portion extending to one side of the effective gear portion of the section for fitting within the rim of the pulley, and having a smaller diameter than the gear portion so that the latter may abut the side of the pulley when the curved portions are fitted within the pulley, and means carried by the curved portion of each section and movable outwardly thereon to enter into binding relation with the inner periphery of the pulley.

3. A gear attachment for pulleys carrying wedges movable in the direction of the turning axis of the attachment and also outwardly with reference to said axis for entering into binding engagement with the inner periphery of a pulley.

4. A gear attachment for pulleys having portions extending laterally and provided with inclined surfaces, wedges movable on said inclined surfaces to coöperate with the inner periphery of the pulley, and means for moving said wedges.

5. A gear attachment for pulleys having portions extending laterally and provided with inclined surfaces, wedges movable on said inclined surfaces to coöperate with the inner periphery of the pulley, and means for moving said wedges embodying screws and nuts on the screws engaging said wedges.

6. A gear attachment for pulleys embodying a plurality of abutting sections, each section having a curved portion projecting laterally therefrom and formed on its outer face with an inclined surface, said section having a bore intersecting the inclined surface, a screw extending through said bore, a nut on said screw, and a wedge straddling said screw and operating on said inclined surface under the control of the nut.

7. A gear attachment for pulleys having portions extending laterally therefrom and provided with bayonet slots for interlocking the parts of the pulley, and means carried by said attachment for producing a binding action on the pulley.

8. A gear attachment for pulleys embodying a plurality of abutting sections, each section having a curved portion projecting laterally from the gear portion and provided with a bayonet slot for interlocking with a portion of the pulley and means carried by each laterally-extending portion for entering into binding engagement with the inner periphery of the pulley.

9. A gear attachment for pulleys embodying a plurality of abutting sections, each section having a gear portion and a curved portion projecting laterally from the gear portion and of less diameter than the gear portion, said curved portion being provided with a bayonet slot, with an inclined surface, and with a bore intersecting said inclined surface, a screw operating in said bore, and a wedge member movable on the inclined surface and operated by said screw.

ZELOTES H. HANEY.

Copies of this patent may be obtained for five cents each, by addressing the "Commissioner of Patents, Washington, D. C."